United States Patent [19]

Masel et al.

[11] Patent Number: 5,543,166
[45] Date of Patent: Aug. 6, 1996

[54] COOKING METHOD AND APPLIANCE

[75] Inventors: Ruben Masel, Ramat Hasharon; George Valdshtein, Ganei Tikva, both of Israel

[73] Assignee: M V Research & Development, Ramat Hasharon, Israel

[21] Appl. No.: 247,109

[22] Filed: May 20, 1994

[30] Foreign Application Priority Data

Aug. 20, 1993 [IL] Israel ......................... 106752

[51] Int. Cl.⁶ .................................. A23C 3/00
[52] U.S. Cl. ........................ 426/523; 426/438; 99/409; 99/348
[58] Field of Search .................... 99/409, 348, 404, 99/410; 426/519, 520, 523, 438; 366/273, 274

[56] References Cited

U.S. PATENT DOCUMENTS

| | | |
|---|---|---|
| 1,344,326 | 6/1920 | Williams . |
| 2,168,604 | 8/1939 | Lee . |
| 2,443,321 | 6/1948 | Miner . |
| 3,178,159 | 4/1965 | Johnson . |
| 3,218,434 | 11/1965 | Lee et al. . |
| 3,236,998 | 2/1966 | Wertheimer et al. . |
| 3,393,295 | 7/1968 | Jepson et al. . |
| 3,433,930 | 3/1969 | Knapp . |
| 4,206,345 | 6/1980 | Maass et al. . |
| 4,209,259 | 6/1980 | Rains et al. ................. 366/273 |
| 4,343,985 | 8/1982 | Wilson et al. . |
| 4,390,283 | 6/1983 | Meyer ........................ 366/273 |
| 4,437,395 | 3/1984 | Speaker ...................... 99/409 |
| 4,653,519 | 3/1987 | Kanner ....................... 366/273 |
| 4,663,517 | 5/1987 | Huff et al. . |
| 4,762,058 | 8/1988 | Masel et al. . |
| 4,873,920 | 10/1989 | Yang ........................... 99/409 |
| 5,133,249 | 7/1992 | Zittel .......................... 99/409 |
| 5,146,841 | 9/1992 | Zittel .......................... 99/409 |
| 5,168,797 | 12/1992 | Wang .......................... 99/409 |

*Primary Examiner*—David Scherbel
*Assistant Examiner*—Reginald L. Alexander
*Attorney, Agent, or Firm*—Ladas & Parry

[57] ABSTRACT

A cooking appliance includes a drum for receiving the food articles to be cooked and formed with a plurality of openings smaller than the size of the food articles. The drum is rotatably mounted about a horizontal axis in the cooking compartment of the appliance such that only the lower part of the drum is immersed in the hot liquid therein, e.g., a frying oil. Also described is a method of frying food articles which includes immersing the bottom of a drum, having the food articles therein, in a quantity of hot cooking oil, and rotating the drum such that the food articles tumble into and out of the cooking oil to cause the food articles to become fried to a crisp without absorbing significant quantities of the cooking oil.

7 Claims, 9 Drawing Sheets

COOKING METHOD AND APPLIANCE

FIELD AND BACKGROUND OF THE INVENTION

The present invention relates to a cooking method and also to a cooking appliance. The invention is especially useful for frying various food articles, such as potatoes, chicken pieces, etc., and is therefore described below with respect to such an application. However, it will be appreciated that the invention could also be used in other applications, for example in steaming food articles such as vegetables.

Many types of frying appliances have been developed and are available. Generally, the known technique is to fry the food articles by immersing them in hot oil. This causes the food articles to become soaked in the oil, which not only detracts from the taste of the food articles but also may be injurious to the health of the consumer of the food article. Moreover, the known types of frying appliances generally require a relatively large quantity of oil, a relatively long cooking time to heat the large quantity of oil, and a relatively large quantity of energy for heating the oil. Further, the known appliances generally produce undesirable oil splash and unpleasant vapours, and are also difficult to clean.

OBJECTS AND BRIEF SUMMARY OF THE INVENTION

An object of the present invention is to provide a cooking appliance, and also a method of cooking, having advantages in some or all of the above respects.

According to one aspect of the present invention, there is provided a cooking appliance comprising a housing having a cooking compartment for containing a liquid to be heated when cooking food articles. The cooking compartment includes a liquid reservoir at the bottom of the compartment for receiving a quantity of a liquid to be heated during the cooking of food articles, and a liquid receptacle at the bottom of the compartment laterally of the liquid reservoir for receiving excess liquid from the cooked food articles. The appliance further includes a drum for receiving the food articles to be cooked. The drum is formed with a plurality of openings smaller than the size of the food articles to be received therein, and is rotatably mounted about a horizontal axis in the cooking compartment such that only the lower part of the drum is immersed in the liquid in the cooking compartment. The appliance further includes heating means for heating the liquid in the cooking compartment, and a drive for rotating the drum. The drive includes a drive control for rotating the drum at a low speed in one direction for cooking the food articles, and at a relatively high speed in the opposite direction for spinning-off excess liquid from the cooked food articles into the liquid receptacle.

According to further features in the described preferred embodiment, the housing is open at the top and includes a channel extending around the periphery of its open top for receiving a quantity of water; the appliance further including a cover removably applied over the open top of the housing with the side of the cover received within the channel to form a water seal with respect to the housing when the channel receives the quantity of water.

According to still further features in one described preferred embodiment, the drum includes scoops for scooping up a quantity of the liquid from the bottom of the cooking compartment, for conveying it to the top of the cooking compartment, and for splashing it over the food articles in the drum during the rotation of the drum.

According to another aspect of the present invention, there is provided a method of cooking food articles comprising: introducing the food articles into a drum having openings smaller than the food articles; immersing the bottom of the drum, with the food articles therein, in a quantity of a hot cooking liquid; rotating the drum such that the food articles tumble into and out of the cooking liquid to cause the food articles to be cooked without absorbing significant quantities of the cooking liquid and during the rotation of the drum while cooking the food articles, scooping up a quantity of the liquid from the bottom of the cooking compartment, conveying it to the top of the cooking compartment, and splashing it over the food articles in the drum.

According to another aspect of the present invention, there is provided a method of frying food articles, comprising: introducing the food articles into a drum having openings smaller than the food articles; immersing the bottom of the drum, with the food articles therein, in a small quantity of hot cooking oil sufficient to form only a small pool of the liquid at the bottom most part of the drum; rotating the drum such that the food articles tumble into and out of the small pool of the cooking oil to cause the food articles to become fried to a crisp without absorbing significant quantities of the cooking oil; providing a liquid receptacle laterally of the bottom of the drum; and, after the food articles have become fried to a crisp, rotating the drum and the food articles therein at a high speed in the opposite direction from that rotated while frying the food articles to spin-off excess cooking oil into the liquid receptacle.

As will be described more particularly below, the foregoing method and cooking appliance may be used for frying food articles with a much smaller amount of oil absorbed by the food article as compared to existing frying appliances and methods. Moreover, the method and appliance consume substantially less oil, and require less cooking oil, less cooking time and less energy because of the need to heat a smaller quantity of oil. Further, such an appliance and method are characterized by being substantially free of smoke, odours and oil splashings.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
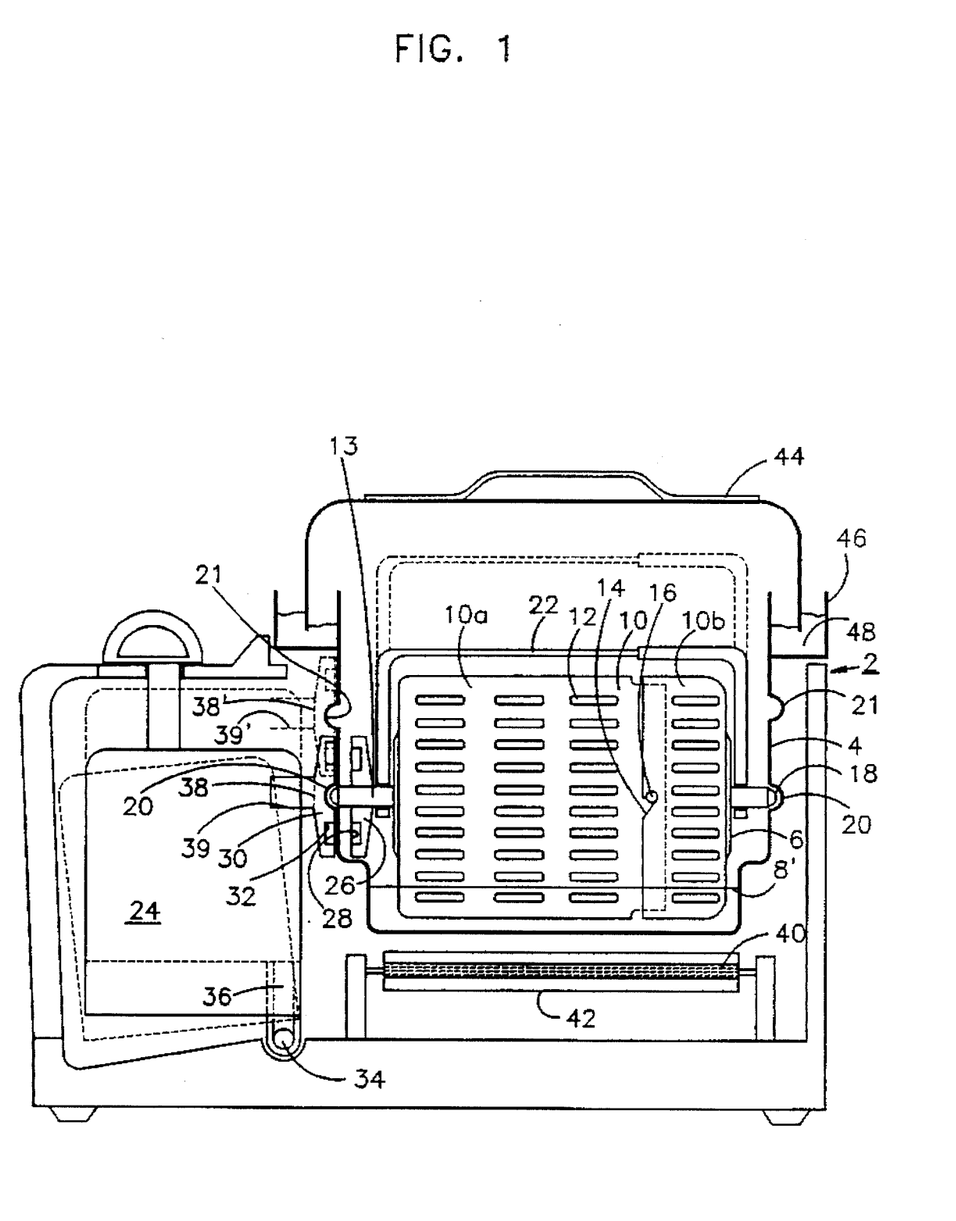
FIG. 1 is a side elevational view illustrating one form of cooking appliance constructed in accordance with the present invention.
Figure 2:
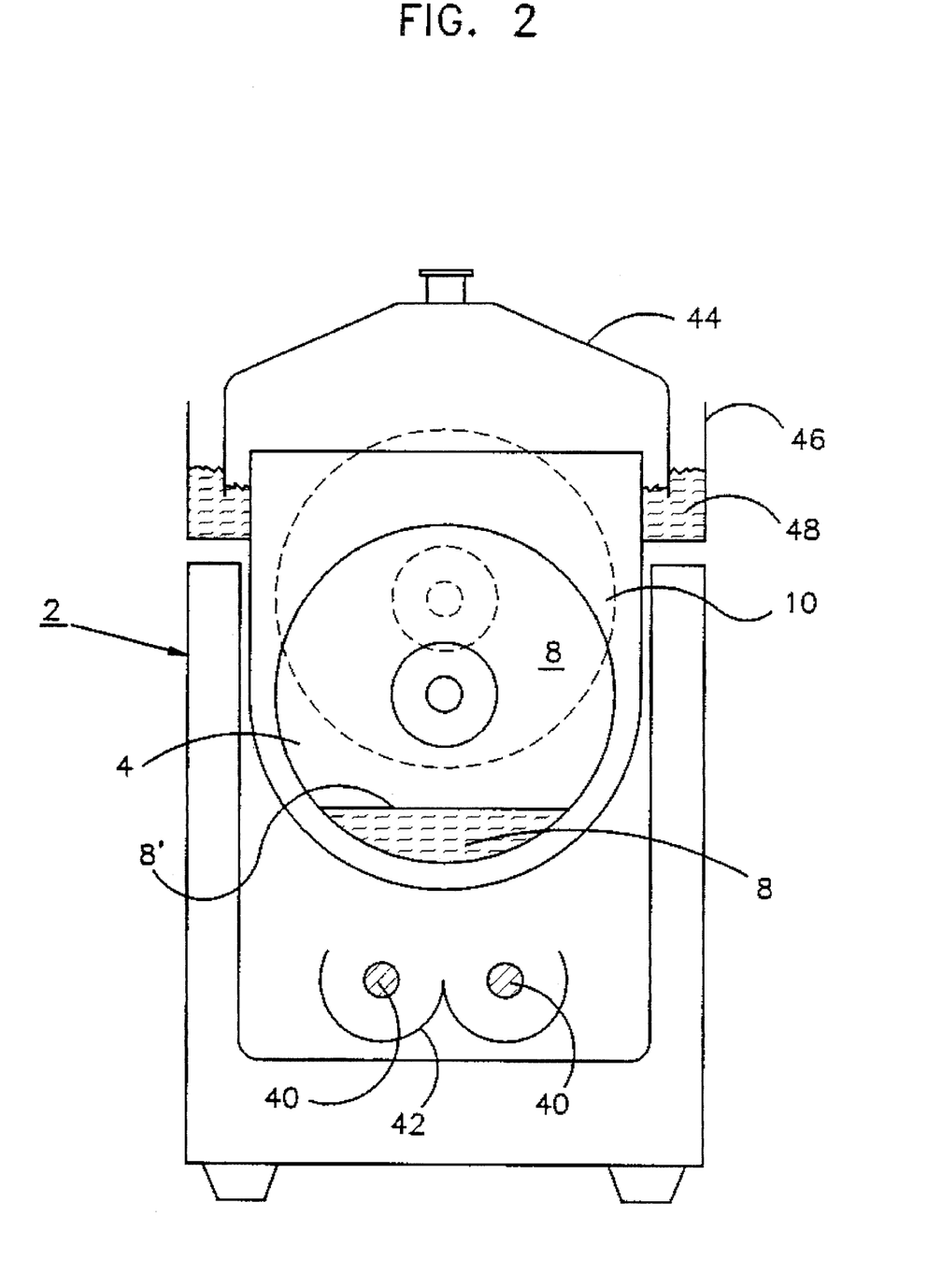
FIG. 2 is an end elevational view of the appliance of FIG. 1.

The Appliance of FIGS. 1 and 2

The appliance illustrated in FIGS. 1 and 2 comprises a housing 2 which includes a container 4 defining a cooking compartment 6 within the housing. Container 4 is adapted to receive a relatively small quantity of a frying oil 8 so as to assume only the level shown at 8' in FIGS. 1 and 2.

Container 4 rotatably supports a drum 10 to receive the food articles to be fried. Drum 10 is formed with a plurality of openings 12 smaller than the size of the food articles to be fried, and is rotatably mounted about a horizontal shaft 13 so that only the lower part of the drum is immersed in the frying oil 8. To facilitate the introduction and removal of the food articles, drum 10 is formed with a main section 10a closed by removable cover 10b having a bayonet slot 14 adapted to receive a pin 16 carried by the drum section 10a.

Drum 10 is quickly attachable and removable from container 4 by means of a ball-and-detent retainer. Thus, drum 10 is provided with a pair of spring-urged balls 18 at the opposite ends of its shelf 13, which balls are adapted to be received within a pair of recesses or detents 20 formed in the container 4. Container 4 is formed with a second pair of recesses 21 at a higher level than recesses 20, to enable the drum to be lifted to a higher level within the container such that its lower end is no longer immersed in the frying oil 8 at the bottom of the container.

Drum 10 is further provided with a bail 22 coupled to its shaft 13 and serving as a handle to facilitate moving the drum to either its lower position wherein its spring-biassed balls 18 are received within the lower pair of recesses 20, or to a higher position wherein they are received within the higher pair of recesses 21. Handle 22 also facilitates the application and removal of the drum with respect to container 4.

The illustrated appliance further includes an electrical motor drive 24 for rotating drum 10. Motor 24 is magnetically coupled to drum 10 by means of a disc 26 fixed to the drum shaft internally within container 4 and carrying a plurality of magnetic elements 28, and a second disc 30 fixed to the motor shaft externally of the container and also carrying a plurality of magnetic elements 32.

Motor 24 may be located in the full-line position illustrated in FIG. 1 so that its coupling disc 30 is in alignment with disc 26 of the drum when the drum is in its lower position as also illustrated in full lines in FIG. 1. Motor 24, however, may also be moved to a higher position, shown in broken-lines in FIG. 1, to align its coupling disc 30 with disc 26 of the drum when the drum is moved to its higher position. In the latter position of the drum, shown in broken lines in FIG. 2, its spring-biassed balls 18 are received within the upper pair of recesses 21 formed in container 4.

Motor 24 includes a transversely-extending shaft 34 movable within a vertical slot 36 formed in housing 2. In addition, the upper end of motor 24 includes a tongue 38 adapted to be received within a lower recess 39 in the housing 2 when the motor is in its lower position as shown in full lines in FIG. 1, or in a higher recess 39' in the housing when the motor, including its tongue (shown at 38'), is raised to its higher position, as shown in broken lines in FIG. 1.

Motor 24 may be operated at two speeds. It is operated at a lower speed when it, and drum 10, are in their lower positions, wherein the spring-biassed balls 18 of the drum are received within the lower pair of recesses 20. Motor 24 is operated at a higher speed when it and drum 10 are in their higher positions, wherein the spring-biassed balls 18 of the drum are received within the higher pair of recesses 21.

The frying oil 8 located within container 6 is heated by a pair of electrical resistance type heaters or a pair of high-intensity infrared radiation lamps 40, such as halogen lamps, located at the bottom of housing 2 under container 4. The infrared radiation from the lamps 40 is directed onto the bottom of the container 4 by reflectors 42. The external surface of container 4 is preferably blackened to increase the absorption of the radiation.

Container 4 is made of a non-magnetic material, such as stainless steel, aluminum, or the like. The magnetic coupling provided by the discs 26, 30 and magnetic elements 28, 32, between the motor 24 and the drum 10 on the opposite sides of the container 4, eliminates the need for forming openings through the container, and permits the drum 10 to be attached and removed from the container in a quick and convenient manner.

As shown in FIGS. 1 and 2, container 4 is formed with an open top which is closed by a removable cover 44. The open top is circumscribed by a channel 46 extending around its outer periphery for receiving a quantity of water 48. The side of cover 44 is received within channel 46, and forms a water seal around the open top of the container 4 when the channel is filled with water.

The cooking utensil illustrated in FIGS. 1 and 2 may be used for frying foods in the following manner: Drum 10 is removed from container 4, and the food articles (e.g., potato sticks, chicken pieces, etc.) to be fried are introduced into the interior of the drum. The frying oil 8 is then introduced into the interior of container 4 to the level indicated at 8', and the drum with the food articles is inserted into the interior of container 4 with the spring-urged balls 18 of the drum received within the lower pair of recesses 20 in the container.

The electrical heaters 40 are then energized, and motor 24, while in its lower (full-line) position, is operated at its low speed to thereby rotate the drum 10 at a low speed by virtue of the magnetic coupling between disc 30 of the motor located externally of the container 4 and disc 26 of the drum located internally within the container.

As the drum thus rotates, the food articles tumble into and out of the liquid oil 8 immersing the lower part of the drum. The food articles thus become fried to a crisp outer surface, without absorbing significant quantities of the oil. Any smoke, odours, etc., generated during the frying of the food articles, are absorbed by the liquid water seal 48 formed in channel 46 between the open top of the container 4 and the cover 44.

After the food articles have thus become fried, the drum 10 may be lifted to its elevated position, with its spring-urged balls 18 received within the higher pair of recesses 21 in the container 4; similarly, the motor 24 may be raised to its higher position in alignment with the raised drum shaft 11. The motor is then operated to rotate the drum at a higher speed in a spin-off mode, in order to remove the excess oil absorbed by the food articles.

Figure 3:
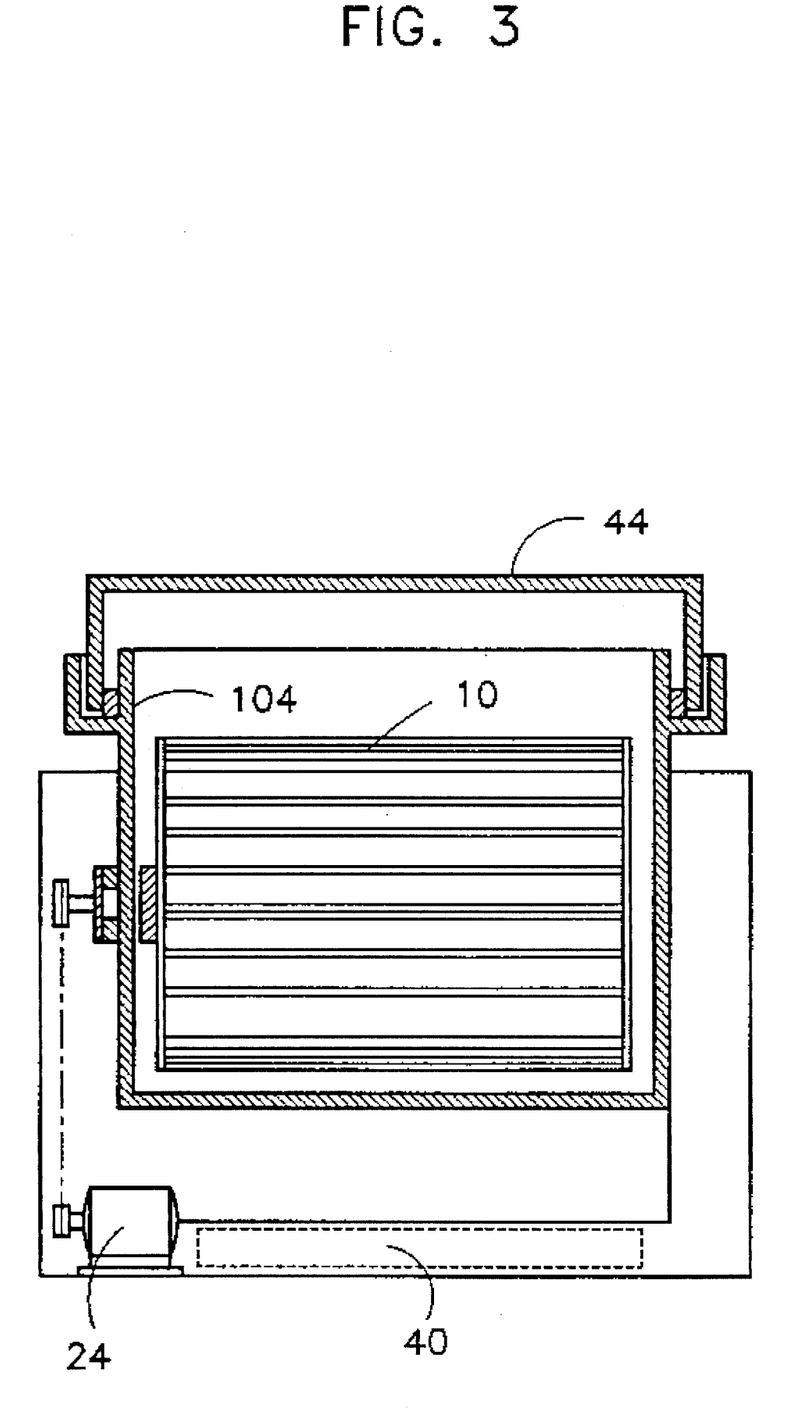
FIG. 3 is a side elevational view illustrating a second cooking appliance constructed in accordance with the invention.
Figure 4:
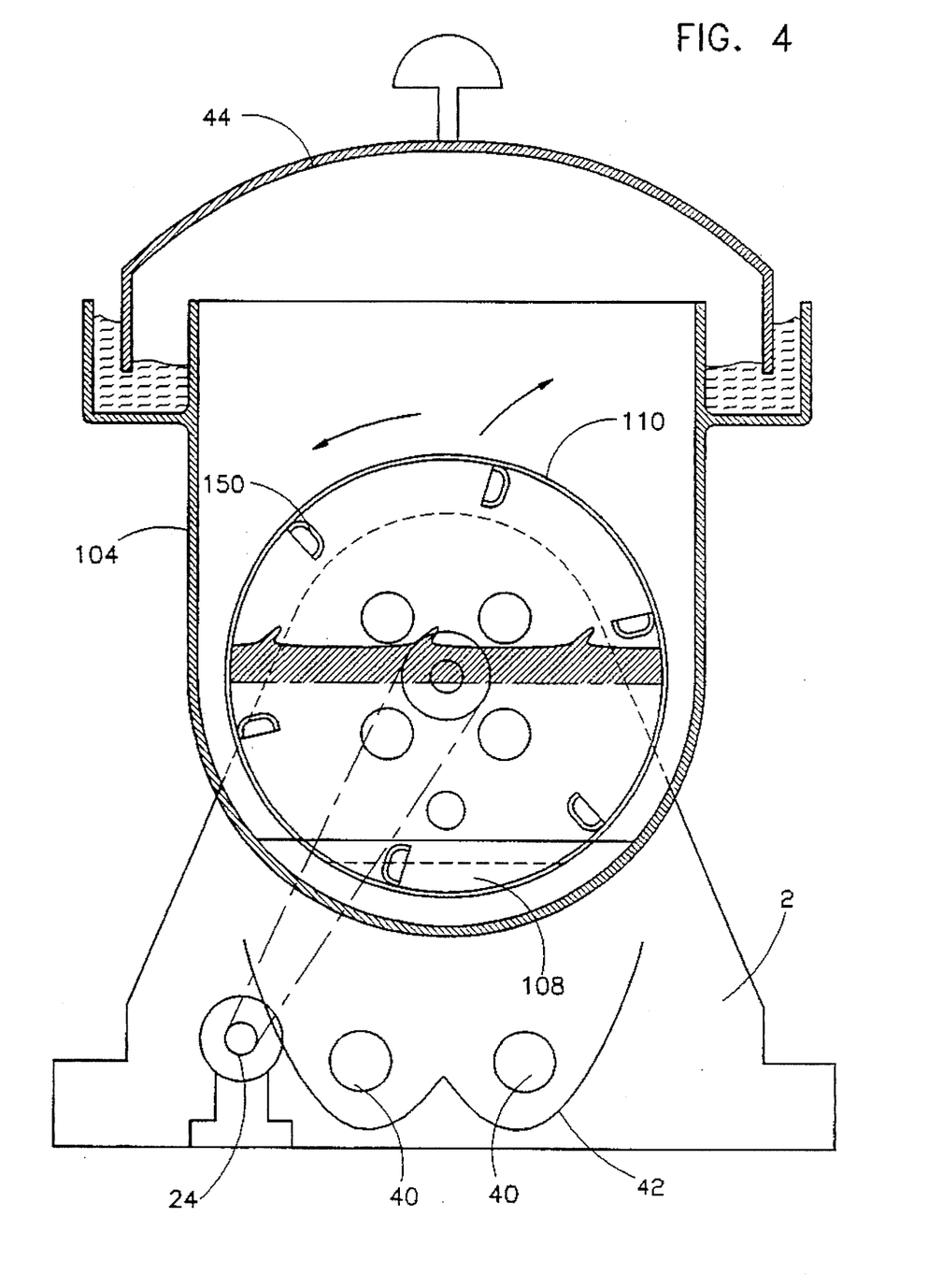
FIG. 4 is an end elevational view of the appliance of FIG. 3.

The Appliance of FIGS. 3 and 4

FIGS. 3 and 4 illustrate an appliance which is very similar to that of FIGS. 1 and 2, except that the drum, therein designated 110, is formed with a plurality of scoops 150 around its outer periphery. During the rotation of the drum 110 while in its lower position, the scoops 150 scoop up a quantity of the oil 108 at the bottom of the container 104. Such oil is conveyed to the top of the drum 110 during the rotation of the drum and is splashed over the food articles within the drum.

The construction and operation of the appliance illustrated in FIGS. 3 and 4 are otherwise the same as described above with respect to FIGS. 1 and 2. The arrangement in FIG. 4 has also been found to produce a crisp, fried outer surface of the food articles without excessive absorption of oil.

Both appliances as illustrated in FIGS. 1, 2 and 3, 4 respectively, may also be used for steaming food articles, such as vegetables, in which case the liquid received within the housing would be water.

The Appliance of FIGS. 5–11

The cooking appliance illustrated in FIGS. 5–11 also includes a housing 202 having a container 204 defining a cooking compartment 206. Container 204 is adapted to receive a relatively small of frying oil 208 so that the oil assumes only the level shown at 208' in FIG. 5. The food articles to be fried are introduced into a drum 210 coated with a non-stick material, such as "Teflon" (Reg. TM), and is formed with a plurality of openings 212 (FIG. 7) smaller than the size of the food articles to be fried. The drum is rotatably mounted about a horizontal shaft 213 such that only the lower part of the drum is immersed in the frying oil 208.

Drum 210 is rotated in one direction (clockwise, FIG. 1) at a relatively slow speed during the frying mode, and in the opposite direction (counter-clockwise, FIG. 5) at a relatively high speed during the spin-off mode when excess liquid is removed from the fried food articles.

Figure 5:
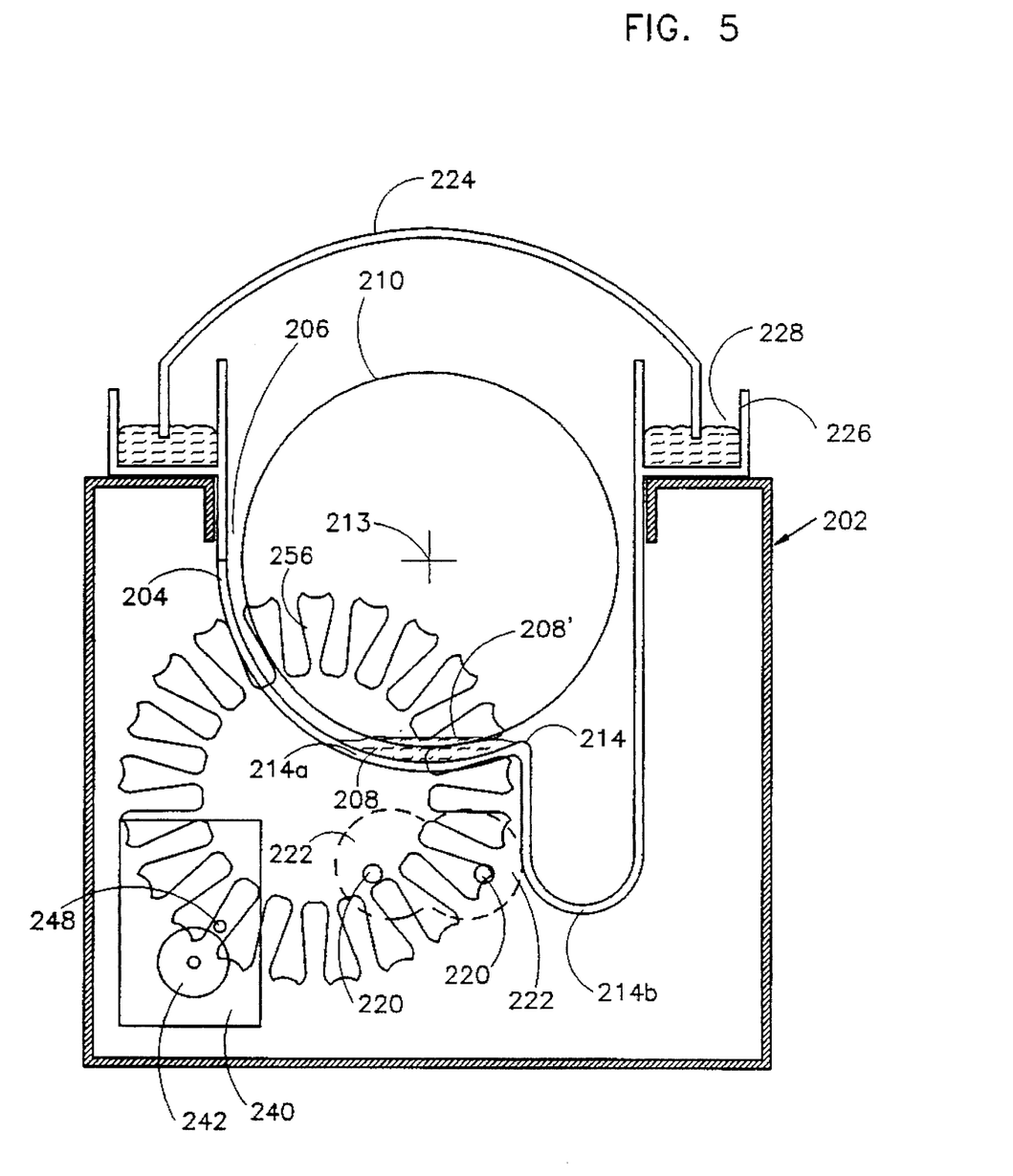
FIG. 5 is an end elevational view of a third form of cooking appliance constructed in accordance with the present invention.
Figure 6:
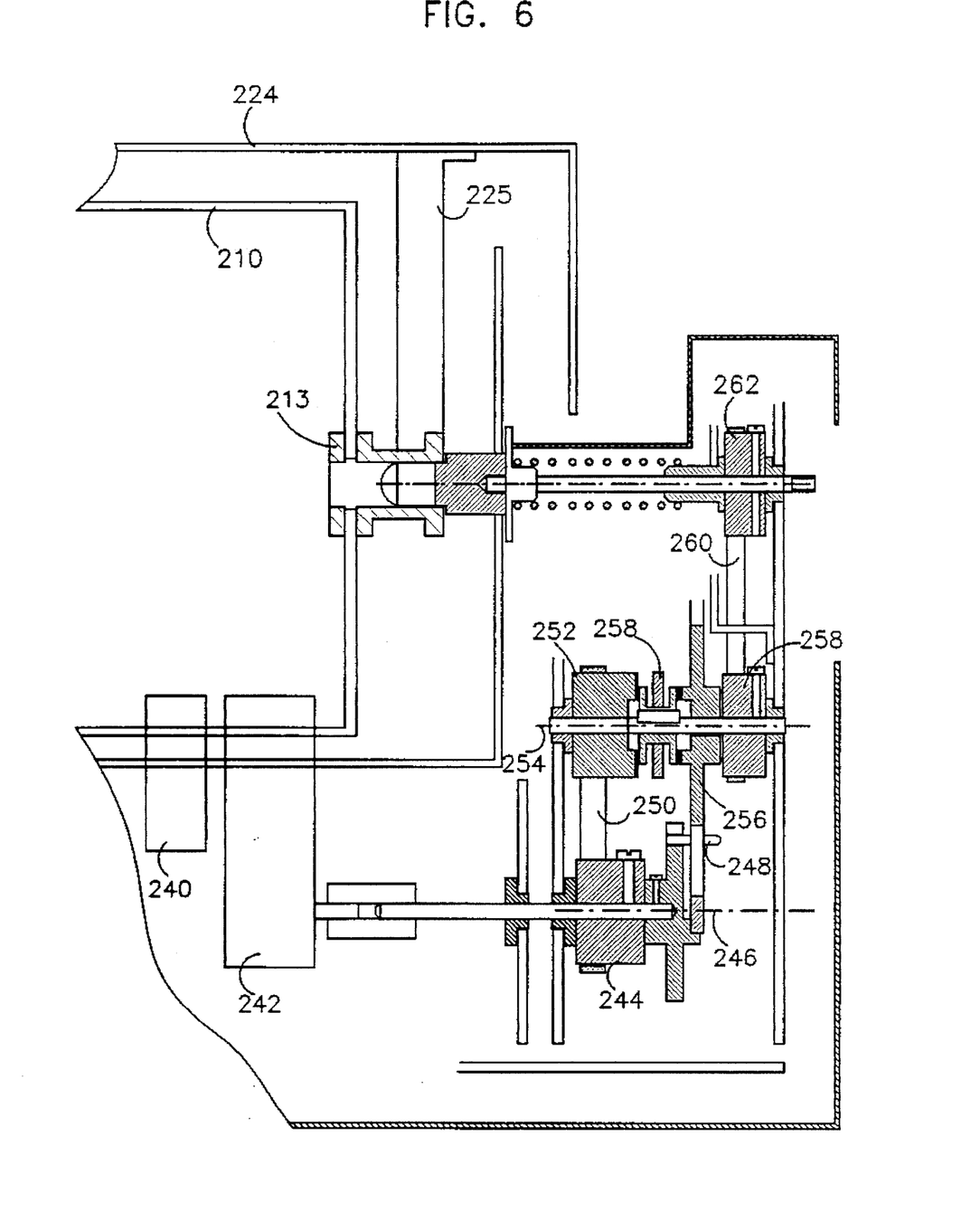
FIG. 6 is a diagrammatic view illustrating the drive in the cooking appliance of FIG. 5.
Figure 7:
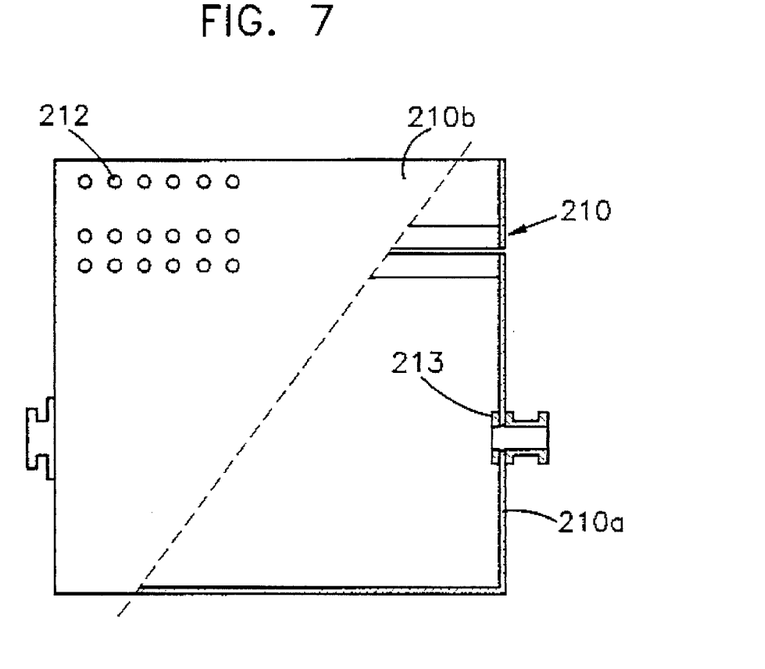
FIG. 7 is a side elevational view illustrating the drum in the cooking appliance of FIGS. 5 and 6.

As shown in FIG. 5, the liquid container 204 is formed with a bottom wall 214 having a first section 214a serving as the oil reservoir for receiving the frying oil 208 to the level 208'. Bottom wall 214 includes a second section 214b laterally of section 214a and serving as an oil receptacle for receiving the excess oil spun-off from the fried food articles during the spin-off mode. The liquid reservoir section 214a of bottom wall 214 is formed with a curvature corresponding to that of the drum 210; whereas the oil receptacle section 214b of the bottom wall is of channel or U-shape in cross-section, and is of deeper depth than section 214a, to receive and hold the excess oil spun-off the fried articles during the spin-off mode.

The frying oil 208 at the bottom of the container 206 is heated by a pair of electrical resistors 220, which may be electrical-resistance type heaters or high-intensity infrared radiation lamps. The infrared radiation produced by heaters 220 is directed to the bottom of section 214a of container 206 by reflectors 222. The external surface of section 214a of the container bottom wall 214 is preferably blackened to increase the radiation absorption. The bottom wall is not physically attached to the electrical resistors or their reflectors 222 and may be easily removed from the container for cleaning purposes.

Container 206 is formed with an open top which is closed by a removable cover 224. The open top is circumscribed by a channel 226 for receiving a quantity of water 228. The lower end of cover 224 is received within channel 226 so that the water within the channel forms a water seal around the open top of the container when the channel is filled with water. The cover 224 is attached to the drum shaft 213 by brackets 225 enabling the drum to be removed with the cover from the container, and also enabling the drum to be removed from the cover for cleaning purposes.

Figure 8:
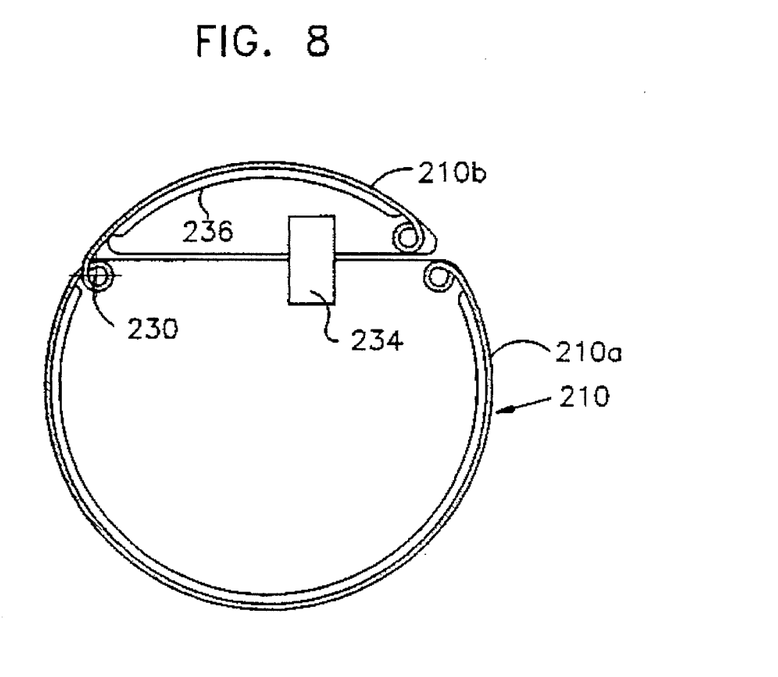
FIGS. 8 and 9 are end elevational views illustrating the drum of FIG. 7 in its closed position and open position, respectively.
Figure 9:
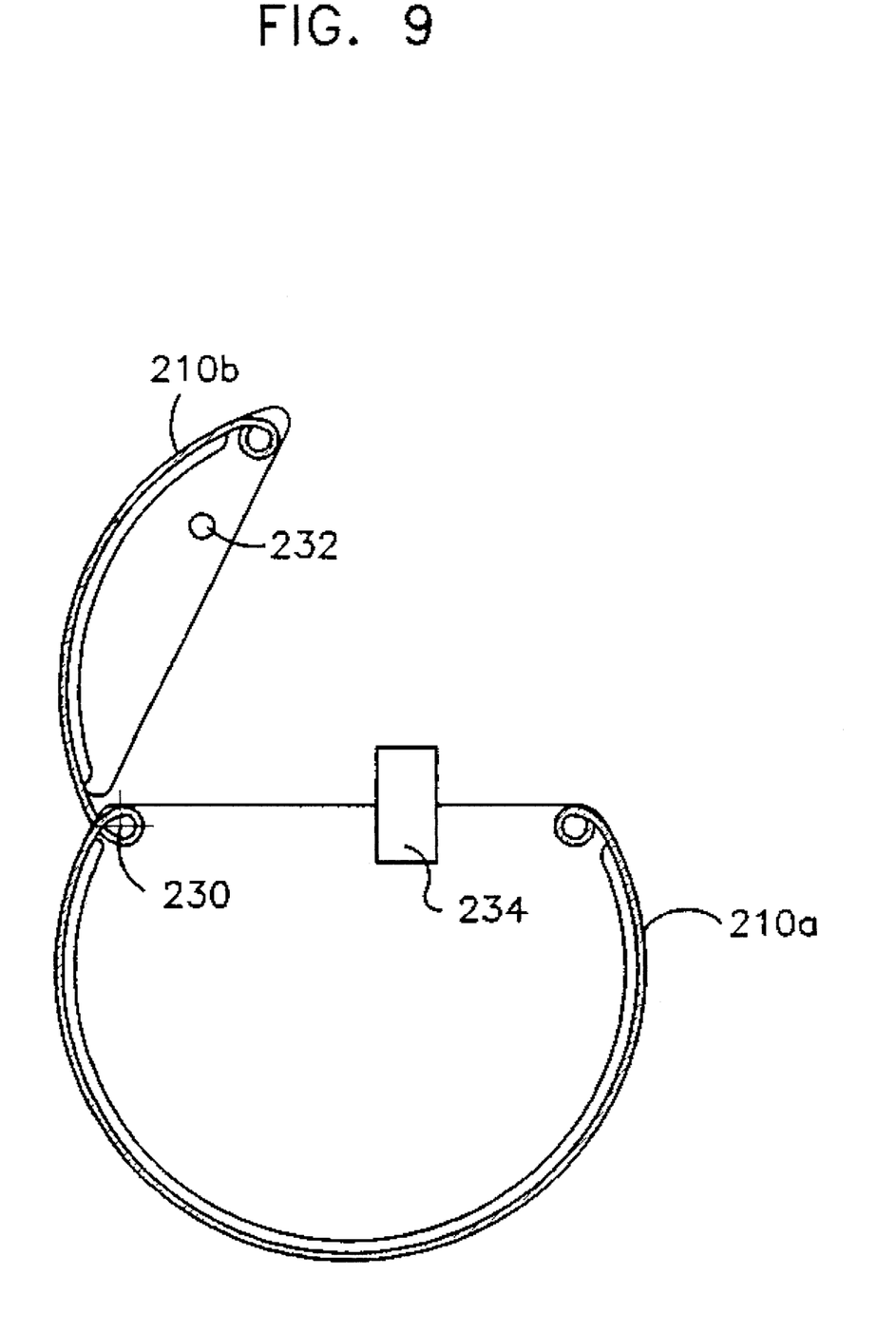

As shown in FIGS. 8 and 9, the drum 210 is formed with a main section 210a and a lid 210b pivotal to an open or closed position about axis 230. Lid 210b may be locked in its closed position in any suitable manner, as by a projection 232 of the lid receivable within a clasp 234 on the main section 210a of the drum.

Figure 10:
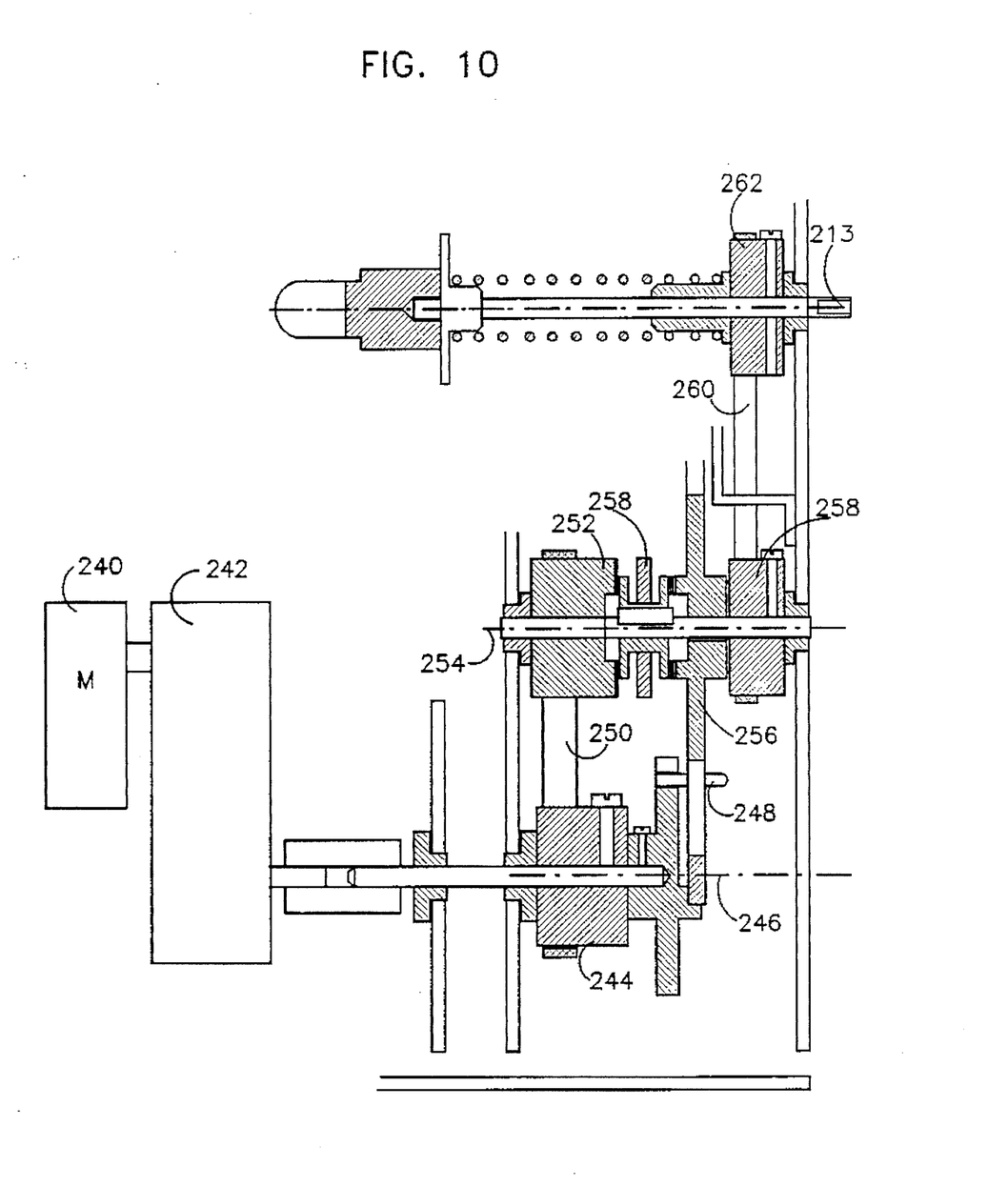
FIG. 10 is an enlarged view more particularly illustrating the drive in the cooking appliance of FIG. 5.

FIG. 10 more particularly illustrates the bi-directional drive for rotating drum 210 slowly in one direction (clockwise, FIG. 5) during the frying mode while the articles within the drum are being fried by the hot oil 208, and rapidly in the reverse direction (counter-clockwise, FIG. 5) during the spin-off mode when the excess liquid is removed from the fried articles and spun-off into the oil receptacle 214b. This drive includes a motor 240, and speed-reducing gearing 242, coupled to a pulley wheel 244 all rotatable about the drive axis 246, and a pin 248 eccentric with respect to the drive axis 246. Pulley 244 is coupled by a belt 250 to another pulley 252 rotatable about an intermediate axis 254; whereas eccentric pin 248 is coupled to a geneva wheel 256 also rotatable about the intermediate axis 254 but at a lower speed than pulley wheel 252 because of the speed-reduction effected by the geneva wheel. In the example illustrated, the reduction by geneva wheel 256 is 1:20.

The intermediate shaft 254 may be selectively coupled by a manually-shiftable or automatically-shiftable (e.g., timer-controlled) coupling member 258 either to the slowly-rotating geneva wheel 256, or to the rapidly-rotating pulley 252. Thus, when coupling member 258 is shifted rightwardly (FIG. 10), it couples intermediate shaft 254 to the slowly-rotating geneva wheel 256; and when the coupling member is shifted leftwardly, it couples the intermediate shaft 254 to the pulley wheel 252 rotating rapidly in the opposite direction. The intermediate shaft 254 carries another pulley wheel 258 coupled by a pulley belt 260 to a pulley wheel 262 carried by the rotary shaft 213 of the drum 210.

The appliance illustrated in FIGS. 5–10 may be used for frying food articles in the following manner:

The food articles are introduced into drum 210, and a relatively small quantity of frying oil 208 is introduced into container 204 to form a small pool at the bottom of the drum, to the level shown at 208' in FIG. 5. Coupling 258 (FIG. 10) is shifted rightwardly to couple the relatively slowly-rotating geneva wheel 256 to the intermediate shaft 254. The pulley coupling 258, 260, 262 of shaft 254 to shaft 213 will rotate drum 210 at a slow speed in the clockwise direction. The electrical heaters 220 beneath the drum heat the oil 208, so that as the drum rotates, the food articles tumble into and out of the hot oil immersed in the lower part of the drum. The food articles thus become fried to a crisp outer surface without absorbing significant quantities of the oil. In addition, any smoke, odours, etc., generated during the frying of the food articles are absorbed by the liquid water seal 228 formed in channel 226 between the open top of the container 204 and the cover 224. The water seal also receives the water evaporated from the food and condensed in the channel.

After the food articles have thus become fried, coupling member 252 (FIG. 10) is shifted leftwardly, to thereby couple the rapidly-rotating pulley wheel 252 to the intermediate shaft 254, so that the drum is now rotated in the opposite direction (counter-clockwise, FIG. 5) at a much higher speed. This rapid rotation of the drum transfers the oil from the pool 208 to the oil receptacle 214b, and also spins-out the excess oil on the food articles into the oil receptacle 214b such that the food articles are left relatively dry of oil.

Preferably, the drum is rotated at a speed of about 0.5–10 rpm during the frying mode, and at a speed of about 50–250 rpm during the spin-off mode. Particularly good results have been obtained when the drum revolution is 6 rpm in the frying mode and 150 rpm in the spin-off mode.

While the invention has been described with respect to several preferred embodiments, it will be appreciated that these are set forth merely for purposes of example, and that many other variations, modifications and applications of the invention may be made.

We claim:

1. A method of cooking food articles, comprising:

introducing the food articles into a drum having openings smaller than the food articles;

immersing the bottom of said drum, with the food articles therein, in a quantity of a hot cooking liquid;

rotating the drum such that the food articles tumble into and out of the cooking liquid to cause the food articles to be cooked without absorbing significant quantities of the cooking liquid; and during the rotation of the drum while cooking the food articles, scooping up a quantity of the liquid from the bottom of the cooking compartment, conveying it to the top of the cooking compartment, and splashing it over the food articles in the drum.

2. The method according to claim 1, wherein said cooking liquid is a cooking oil.

3. The method according to claim 1, including the further step, after the food articles have become cooked, of rotating the drum and the food articles therein, at a high speed to remove excess cooking liquid absorbed by the food articles.

4. The method according to claim 3, wherein the drum is rotated at said high speed in the opposite direction from that rotated while cooking the food articles to spin-off said excess liquid into a liquid receptacle laterally of the drum.

5. A method of frying food articles, comprising:

introducing the food articles into a drum having openings smaller than the food articles;

immersing the bottom of said drum, with the food articles therein, in a small quantity of hot cooking oil sufficient to form only a small pool of the liquid at the bottom most part of the drum;

rotating the drum such that the food articles tumble into and out of said small pool of the cooking oil to cause the food articles to become fried to a crisp without absorbing significant quantities of the cooking oil;

providing a liquid receptacle laterally of the bottom of the drum;

and, after the food articles have become fried to a crisp, rotating the drum and the food articles therein at a high speed in the opposite direction from that rotated while frying the food articles to spin-off excess cooking oil into said liquid receptacle.

6. The method according to claim 5, wherein said drum is rotated at a speed of 0.5–10 rpm in said first direction, and at a speed of 50–250 rpm in said opposite direction.

7. The method according to claim 5, including the further steps, during the rotation of the drum while frying the food articles, of scooping up a quantity of the liquid oil from the bottom of the cooking compartment, conveying it to the top of the cooking compartment, and splashing it over the food articles in the drum.

* * * * *